June 21, 1955  G. T. BALFE  2,711,334
LAMINATED GASKET
Filed July 5, 1951
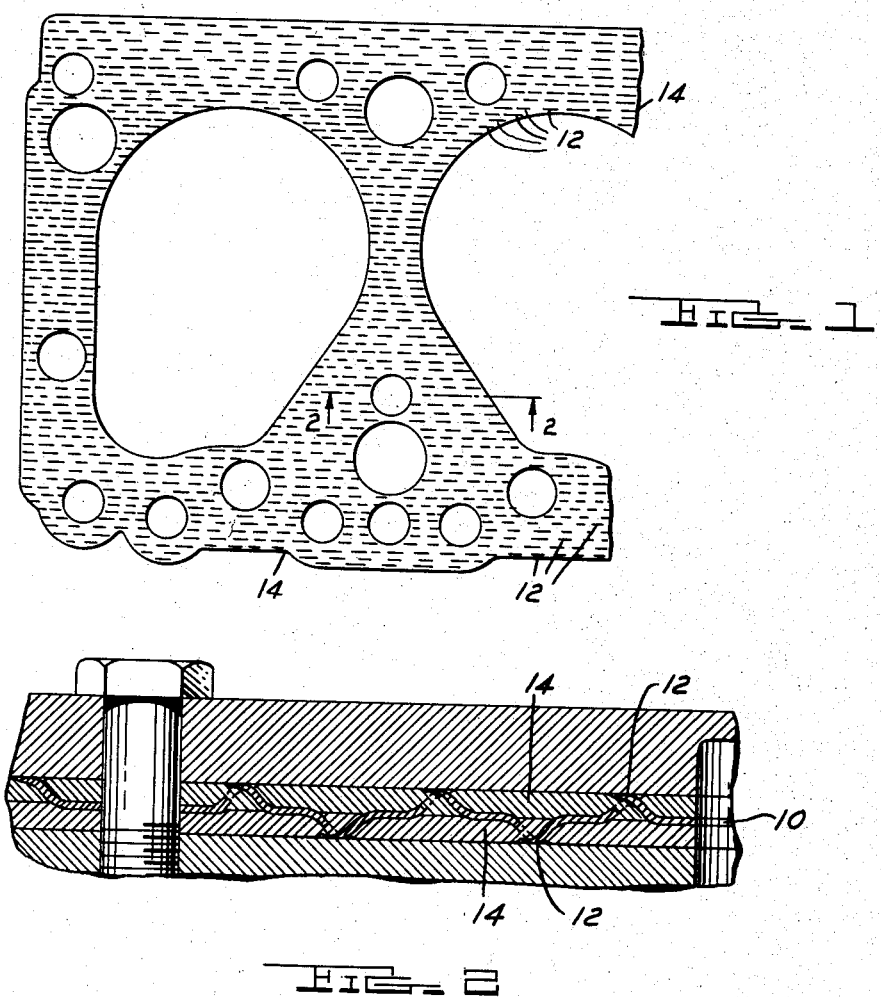
INVENTOR.
GEORGE T. BALFE
BY
Burton & Parker
ATTORNEYS

United States Patent Office 2,711,334
Patented June 21, 1955

2,711,334

LAMINATED GASKET

George T. Balfe, Detroit, Mich., assignor to Detroit Gasket & Manufacturing Company, Detroit, Mich., a corporation of Michigan Application July 5, 1951, Serial No. 235,171

4 Claims. (Cl. 288—31)

This invention relates to an improved gasket and particularly to a gasket of the character such as is employed in internal combustion engines between the cylinder block and the cylinder head to seal the joints about the combustion chambers and the fluid pressure openings.

This gasket is particularly designed to be used on high compression internal combustion engines wherein the gasket is subject to high heat and high pressure.

An object is to provide an improved gasket for high compression internal combustion engines which gasket is relatively thin and presents a minimum thickness to the heat within the combustion chambers, yet is adapted to effectively seal the joint between the cylinder block and the cylinder head against leakage.

Heretofore, gaskets have been provided for the purpose above described which gaskets were formed of metal sheets, or metal and asbestos fiber sheets laminated together, or in various ways. One conventional and widely used type of gasket consisted of a core layer of metal to the opposite sides of which laminations of asbestos were secured. Such gasket when provided for the cylinder head of an internal combustion automobile engine might possess a normal uncompressed thickness of .064".

The gasket of this invention is formed of metal throughout. It comprises a plurality of metal layers securely laminated together. The inner core layer consists of a steel sheet. The outer surface layers are formed of aluminum, or other suitably soft and readily deformable metal secured to the steel core layer. The entire gasket presents a thickness substantially less than half of that of the laminated steel asbestos gasket immediately hereinabove referred to. As compared with a steel asbestos gasket of .064" normal uncompressed thickness, the gasket of this application preferably presents a thickness less than .030". Such gaskets have been found successful as cylinder head gaskets under severe conditions of use with high compression internal combustion motor vehicle engines.

Various other objects and advantages of the gasket of this invention will appear from the following description, claims and the accompanying drawing, wherein Fig. 1 is a plan of a fragment of a cylinder head gasket embodying the invention;

Fig. 2 is a substantially enlarged sectional view taken along line 2—2 of Fig. 1.

The gasket of this invention has been designed primarily as a cylinder head gasket for high compression internal combustion engines, in which the heat and the pressure is high and where it is desired to have a gasket which is relatively thin so that a minimum amount of gasket material is exposed. It is necessary however that the gasket seal the joint formed between the cylinder head and the block and seal it effectively against leakage which would result because of the high pressure.

The gasket of this invention is formed of three layers of metal laminated securely together. The inner layer is formed of a resilient sheet of steel. This serves as the core layer and has a plurality of closely associated prongs punched therefrom in opposite directions. This layer is indicated in the drawing of Fig. 2 as 10 and the prongs are indicated by the numeral 12. The two outer layers, each of which is indicated by the numeral 14, are formed of a soft easily deformable material, such as dead, soft aluminum. Soft copper or magnesium might be used. In the formation of the gasket a steel sheet may be rolled in a machine such as is shown in applicant's Patent No. 1,843,438 to form the prongs in the steel layer. Such prongs project in opposite directions from the sheet. They are closely associated together. The prongs have a height greater than the thickness of the sheet.

The soft aluminum layers are then rolled on to the steel layer and the prongs are pressed through the aluminum layers and embedded therein being in part clenched thereover as shown in Fig. 2. The prongs extend through the aluminum layers and are bent over thereinto. The prongs themselves are resilient, as is the steel layer. The soft outer aluminum layers are not inherently resilient. The embedding of the prongs in the soft outer aluminum layers tends to urge such aluminum layers to resist compression against the core layer when the gasket is put into use.

Following the laminating of the three layers together, the laminated gasket is annealed. Aluminum anneals at relatively low temperatures of 700 to 850° F. Such annealing temperatures are insufficient to anneal the steel but the strains resulting from the fabrication of the structure are minimized.

The structure is designed, as heretofore stated, to present a minimum thickness. The completed gasket may well present a normal uncompressed thickness of less than .030". When the gasket is placed in use between the cylinder head and the cylinder block and the stud bolts tightened down under normal bolt-lightening pressures the soft outer metal layers are deformed by the surface irregularities of the block and the head and yield so as to fill the surface recesses and provide a tight joint with the surface of the head and the surface of the block. Each of the two outer layers of the laminated gasket has a normal uncompressed thickness not exceeding .010". A gasket having a normal overall uncompressed thickness of .0297" may be compressed under such bolt lightening pressure to present an overall thickness in use of .0283". When the head is removed, such gasket because of the resiliency of the prongs embedded throughout the area of the outer surface layers may expand to present an overall thickness of .029". The surface irregularities in the co-operating surfaces of the block and head may reach .001 of an inch in each part. The soft outer surface layers conform to substantially fill such irregularities. The resilient prongs serve to assist such layers in maintaining such close contact under use. The figures which have been given were taken from actual tests.

What I claim is:

1. A gasket having a fluid opening therethrough and consisting of three layers of metal laminated together, the inner core layer being a steel sheet layer having a multiplicity of closely associated prongs punched therefrom on opposite sides, the two outer layers being formed of dead soft aluminum continuous sheet material which is readily deformable but inherently nonresilient, said two outer layers pressed tightly against the opposite sides of the core layer with the prongs of the core layer embedded and clenched over thereinto and extending at an angle less than a right angle with respect to the plane of the core layer, said prongs possessing an inherent resiliency yieldingly tensioning the soft aluminum material of the two outer layers to resiliently resist compression thereof against the core layer.

2. A gasket consisting of three layers of metal laminated together, the inner core layer being a steel sheet layer having a multiplicity of closely associated prongs punched therefrom on opposite sides, the two outer layers being continuous sheet metal layers of deformable nonresilient material possessing a softness approximating that of dead soft aluminum, said two outer layers being pressed tightly against the opposite sides of the core layer with the prongs of the core layer embedded and clenched over within the other layers, said prongs when embedded within the two outer layers extending away from the plane of the core layer at an angle thereto which is less than a right angle, said prongs being inherently resilient and yieldingly resisting bending thereof toward the core layer and tensioning the material of the two outer layers to resist compression thereof toward the core layer.

3. A gasket such as defined in claim 2, characterized in that each of the two outer layers has a normal uncompressed thickness not exceeding .010" and the prongs of the core layer have a height above the plane of the core layer not less than the normal thickness of one outer surface layer and said laminated gasket being annealed at a temperature sufficiently high to anneal the soft outer surface layers but insufficient to anneal the material of the core layer.

4. A laminated gasket consisting of a steel sheet core layer having a multiplicity of closely associated prongs punched therefrom on one surface and substantially throughout the area thereof and an outer layer of readily deformable nonresilient sheet metal having a softness approximately that of dead soft aluminum pressed tightly against that surface of the core layer provided with the prongs and with the prongs extending thereinto and clenched thereover, said prongs extending away from the plane of the core layer through the outer layer at an angle of less than 90° with respect to the plane of the core layer and being inherently resilient and resisting bending thereof towards the plane of the core layer and tensioning the outer layer to resist compression thereof against the core layer.

References Cited in the file of this patent

UNITED STATES PATENTS

| | | |
|---|---|---|
| 1,656,892 | Shorer | Jan. 17, 1928 |
| 1,792,377 | Jordan | Feb. 10, 1931 |
| 1,863,521 | Crane | June 14, 1932 |
| 2,011,563 | Balfe | Aug. 20, 1935 |
| 2,055,471 | Balfe | Sept. 29, 1936 |
| 2,114,442 | Fitzgerald | Apr. 19, 1938 |
| 2,135,807 | Fitzgerald | Nov. 8, 1938 |
| 2,197,916 | Balfe | Apr. 23, 1940 |